Dec. 5, 1933.   D. R. McCAFFERY   1,938,457
LIMITED RATIO DEVICE
Filed July 30, 1932   5 Sheets-Sheet 1

Patented Dec. 5, 1933

1,938,457

UNITED STATES PATENT OFFICE 1,938,457

LIMITED RATIO DEVICE

Duncan Rol? ld McCaffery, Woodstock, Ontario, Canada

Application July 30, 1932. Serial No. 626,777

6 Claims. (Cl. 74—99)

The invention relates to a limited ratio device, as described in the present specification and illustrated in the accompanying drawings which form a part of the same.

The invention consists essentially in maintaining a rotating member in coincident motion with the axle shafts of a motor driven vehicle and correcting the speed of one or the other axle shaft through said member above or below the accepted limit of the ratio as pointed out in the claims for novelty following a description of several ways of carrying out the invention, all working on the same principle.

The objects of the invention are to apply means for taking over the control of driven members subject to an abnormal condition over which the differential has no control and automatically offering no hindrance to the normal operations of said differential under ordinary conditions thereby saving life and property in automotive transportation by reducing dangerous conditions in regards to skidding and spinning one of the traction wheels in relation to the other to maintain the control of the ratio of speed and power output between the driving wheels; and generally to provide a limited ratio device that will control the movements of one or other of the driving wheels operating in excess of its individual function and reduce to a great extent possible mishaps and inconveniences encountered with the ordinary differential and over which the differential alone would have no control.

In the drawings, Figure 1 is a plan view of the exterior of the differential housing.

Like numerals of reference indicate corresponding parts in the various figures.

Figure 1:
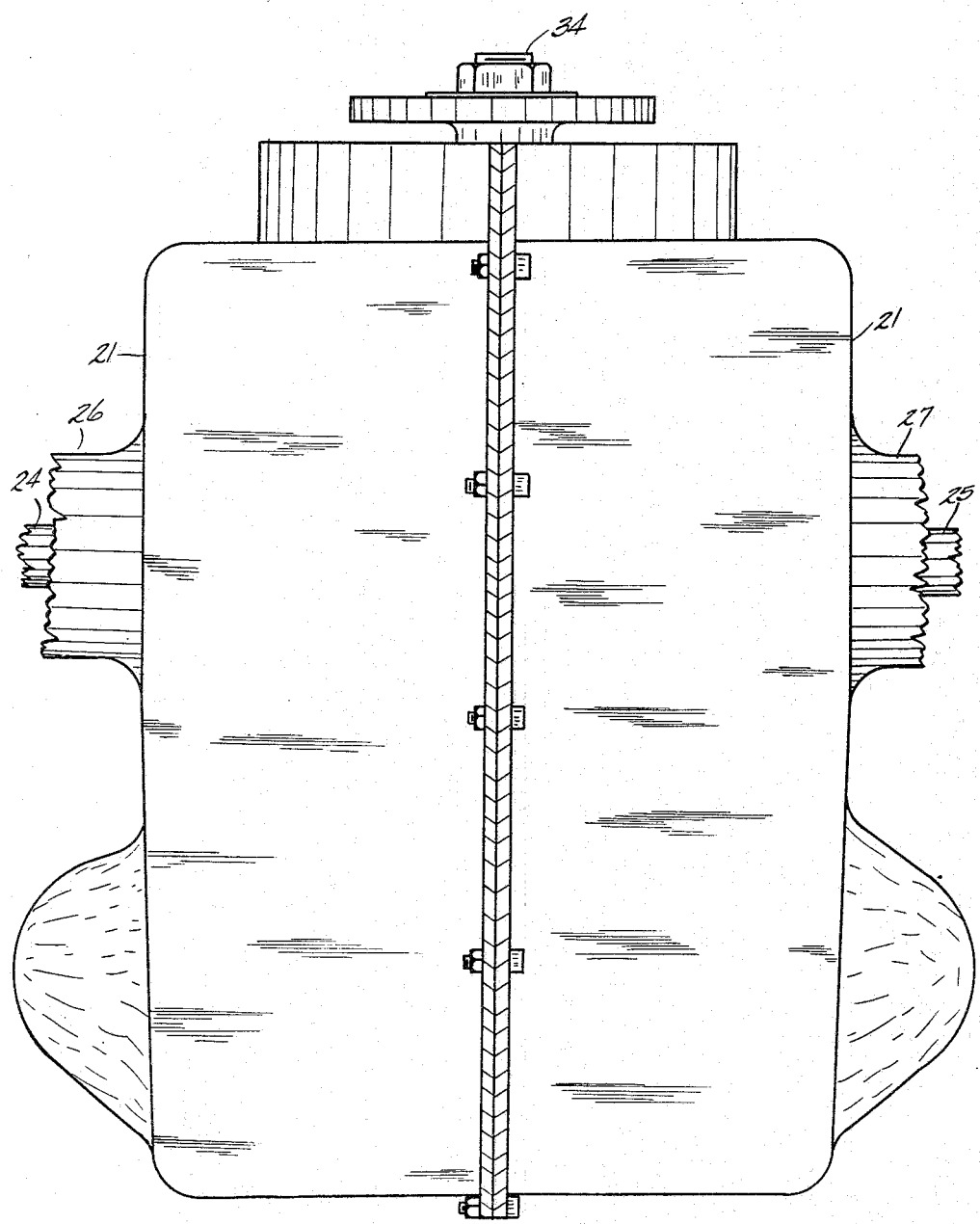

Referring to the drawings, the controlling shaft, indicated by the numeral 15 carries at one end the clutch nut 16 on the screw 17 and at the other end the clutch nut 18 on the screw 19, this shaft being journalled in the bearings 20, within the casing 21, this casing being so shaped as to contain the conventional differential gear mechanism 22 in the rotating housing 23 from which the axles 24 and 25 extend to the driving wheels through the axle housings 26 and 27 respectively.

The gears 28 and 29 are fixedly secured to the housing 23 on either side and therefore rotate coincidently with the rotation of the housing and the gear 30 coacts with the gear 29, while the gear 31 coacts with the gear 28.

The gear 32 is fixedly secured to the housing 23 and this gear coacts with the gear 33 mounted on the transmission shaft 34. This is all conventional construction with the exception of the controlling shaft and gears connected therewith.

The gear 35 coacts with the gear 36, the gear 35 being on the axle 25 and the gear 36 being on the controlling shaft 15. The gear 37 coacts with the gear 38, the gear 37 being on the axle 24 and the gear 38 being on the controlling shaft 15, therefore there is a natural braking or speed regulating gear mechanism adjacent to the threads 17 and 19 at either end of the shaft 15 for the purpose of making the free axle conform to the speed of the operating axle.

The clutch nut 18 cooperates with the clutch member 39 from the gear 36 while the clutch nut 16 cooperates with the clutch member 40 from the gear 38.

The sleeve clutch member 41 is fixedly mounted on the controlling shaft 15 and the ring clutch member 42 is keyed to the sleeve clutch member 41, and is slidable into engagement with the clutch 43 from the gear 31, this clutch 42 being operated by the threaded extension 44 in engagement with the threaded flange 45, this flange being in turn engaged by the friction spring 46 fixedly secured by the screw 47 to the gear 30, thus in rotation the housing 23 rotates the gear 29 which screws the clutch 42 into engagement with the gear 31 and this gear is then moved into engagement with the clutch member 48 from the sleeve 41 which brings about the rotation of the controlling shaft 15 for forward motion.

The controlling shaft 15 then becomes the speed ratio adjusting member in relation to the axles 24 and 25, and it all depends when this controlling shaft comes into connection, on the differences of speed of the axles for the operation of the clutch nuts 18 or 16 and similarly the gears 38 or 36 respectively only come into operation when the nuts operate.

The engagement of the nut 16 with the clutch member 40 brings the said clutch member 40 into engagement with the clutch member 48 from the sleeve 41 and therefore brings the gear 38 into coincident rotation with the shaft 15. Presuming that the axle 24 is racing or going at an enormous speed in relation to the speed of the other axle 25, such as skidding, etc., then the gear 38 will naturally be going for a moment only at the fast speed for it will be found at the other end of the shaft that the nut 18 has been in engagement at the same time with the clutch member 39 and this clutch member 39 has brought the gear 36 into operating engagement with the collar clutch 49, fast on the shaft 15, and thus the communicated speed from axis 24 to the shaft 15 through gears 28 and 31 and the central clutch mechanism is curbed through the action of the nut 18 and gears 36 and 35 which keeps the shaft 15 in coincident rotation with the axle 25.

It may be pointed out in connection with the operation of the clutch nuts that the friction springs 50 for the clutch member 40 and nut 16, and 51 for the clutch member 39 and nut 18 are rigidly secured to said clutch members 40 and 39 respectively by the screws 52 and 53 respectively, and this means that the clutch nuts are rotated outwardly or inwardly on the threads 17 and 19 respectively thorugh the rotation of the gears 38 and 36.

Therefore the increase in the speed of the shaft 15 communicated through the differential gears 28 and 31 and the central clutch mechanism from the axle 24 brings in the nut 18 on the thread through the engagement of the spring 51 from the gear 36 and the result of this communication of the speed of the axle 24 to the shaft 15 is that the speed of rotation of the shaft brings the nut 18 into coaction with the friction spring 51 and turns this nut 18 on its thread to bring the gear 36 and clutch 39 into coaction with the collar clutch 49 on shaft 15, and as the gear 36 coacts with the gear 35 and the speed of the axle 25 is normal, the speed of the axle 25 must be communicated to the shaft 15 for the axle 25 is under load. Therefore through the controlling shaft the speed of the axle 25 is communicated by the central clutch mechanism and the gear 31 and gear 28 and the differential to the axle 24, the speed of which is immediately curbed.

It will be seen in the particular action of this invention that only one clutch nut either 16 or 18 whatever the case may be is in operation at the one time, in other words, say if the traction wheel on axle 25 starts to spin or otherwise develop abnormal conditions, the clutch nut 16 at the opposite end of the countershaft 15 has been forced into engagement with the gear 38 which co-acts with the central clutching mechanism to bring the offending wheel under control or in other words regulate its movements to conform with the main driving gears.

When the machine is driven forward on the straight way, the differential rotates in the direction of the arrow (a) and lock nut gear 30 is driven in the opposite direction through differential lock nut gear 29. This rotates lock nut 45, which has a right hand internal thread, and is rotated by spring 46, which is attached to lock nut gear 30, this action forces clutch sleeve 42 into gear 31 causing countershaft 15 to revolve in unison with gear 31. Axle ratio gears 35 and 37 are loosely fitted to key ways in axle shafts 25 and 24. Gears 35 and 37 cause gears 36 and 38 to rotate faster than countershaft 15, and in the same direction, and causes clutch nuts 18 and 16 to hold out against washers 55 permitting gears 36 and 38 to run freely on countershaft 15. Should the speed of either of the gears 36 or 38 reduce below the speed of the countershaft 15 spring 51 or 50 respectively would cause the clutch nut 18 or 16 respectively which are threaded to the countershaft to rotate in and engage with the countershaft ratio gear 36 or 38 respectively and thus keep it from decreasing further. When the speed of the gear rises above that of the countershaft, the clutch nut would return to its former position against washer 55, allowing countershaft ratio gears to run free again and the countershaft 15 would continue to be driven by gear 31 and the central clutch mechanism.

In the case of the gear being reversed, the parts in the limited ratio device perform exactly the same only in a different way. In reverse the threaded flange or lock nut 45 having the right hand internal thread forces out of engagement clutch 42 and allows gear 31 to run free. When this clutch is released it will be noted that the gears 35 and 36 or 37 and 38, whatever the case may be, now become the driving members for the countershaft 15. The action then is the same as in the forward motion, that is, should one of the gears 36 or 38 be caused to speed up and cause the countershaft 15 to speed up, the clutch nut 16 or 18 whatever the case may be, on the opposite end of the countershaft to the speeding gear would go back against the washer 55 and as the countershaft continued to increase its speed beyond that of the lock nut gear 30, the flange 45 with its right hand internal thread would force clutch sleeve 42 in against the gear 31 and retard thusly the speeding of the countershaft and directly the speed of the offending wheel.

When the normal speed has been reached, the clutch sleeve 42 wil be drawn back out of engagement with the gear 31 and the countershaft 15 would continue to be driven by the ratio gears 36 and 38.

In the event of the car using this limited ratio device turning a corner, the clutch nuts and mechanisms on the countershaft 15 will remain inoperative as the diameter of all gears permits the variation required in turning corners and this is taken care of in the ordinary differential gear mechanism.

This is the case in forward and backward motion in a vehicle using this device and it will be noted that this device is only in operation after the required limits of variation in an ordinary differential have been reached and over which it alone would have no control.

In this invention it will be seen there are really three ratio control members, but only one acts as a control member at one time, while another acts as a driving member and the third one is in-active.

Figure 2:
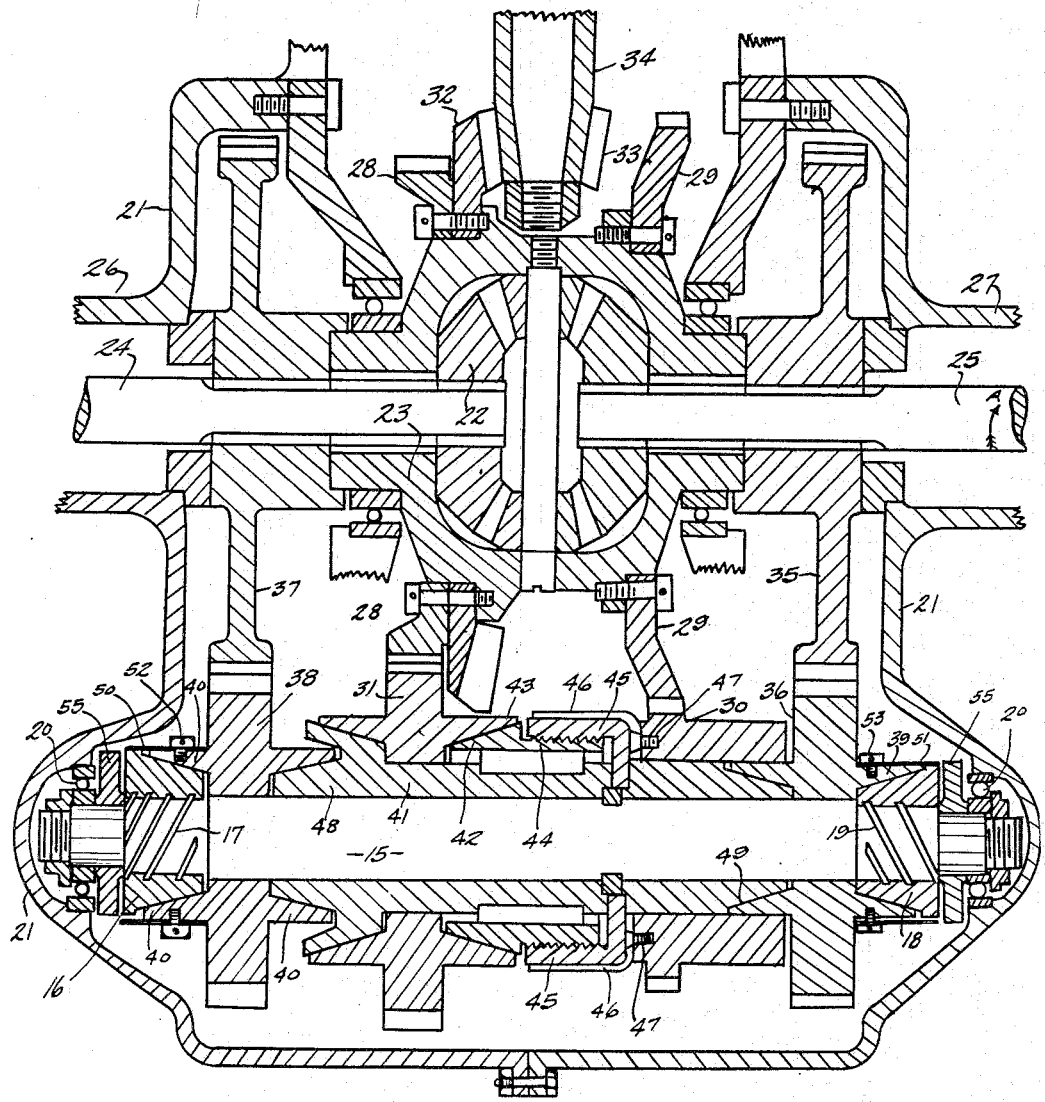
Figure 2 is a horizontal medial section through the housing and gear mechanism embodying the invention.
Figure 3:
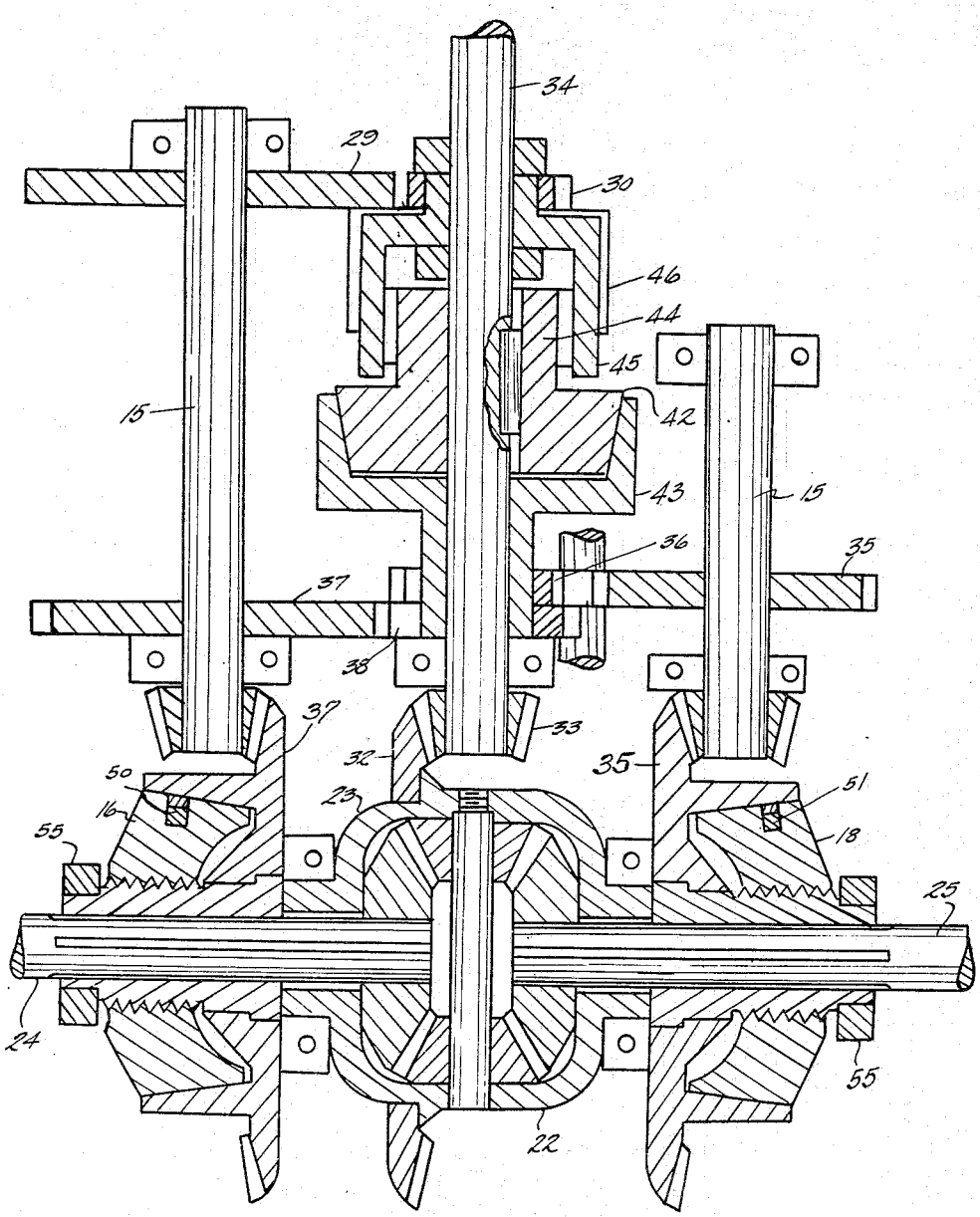
Figure 3 is a modified form utilizing the same principle of operation.
Figure 4:
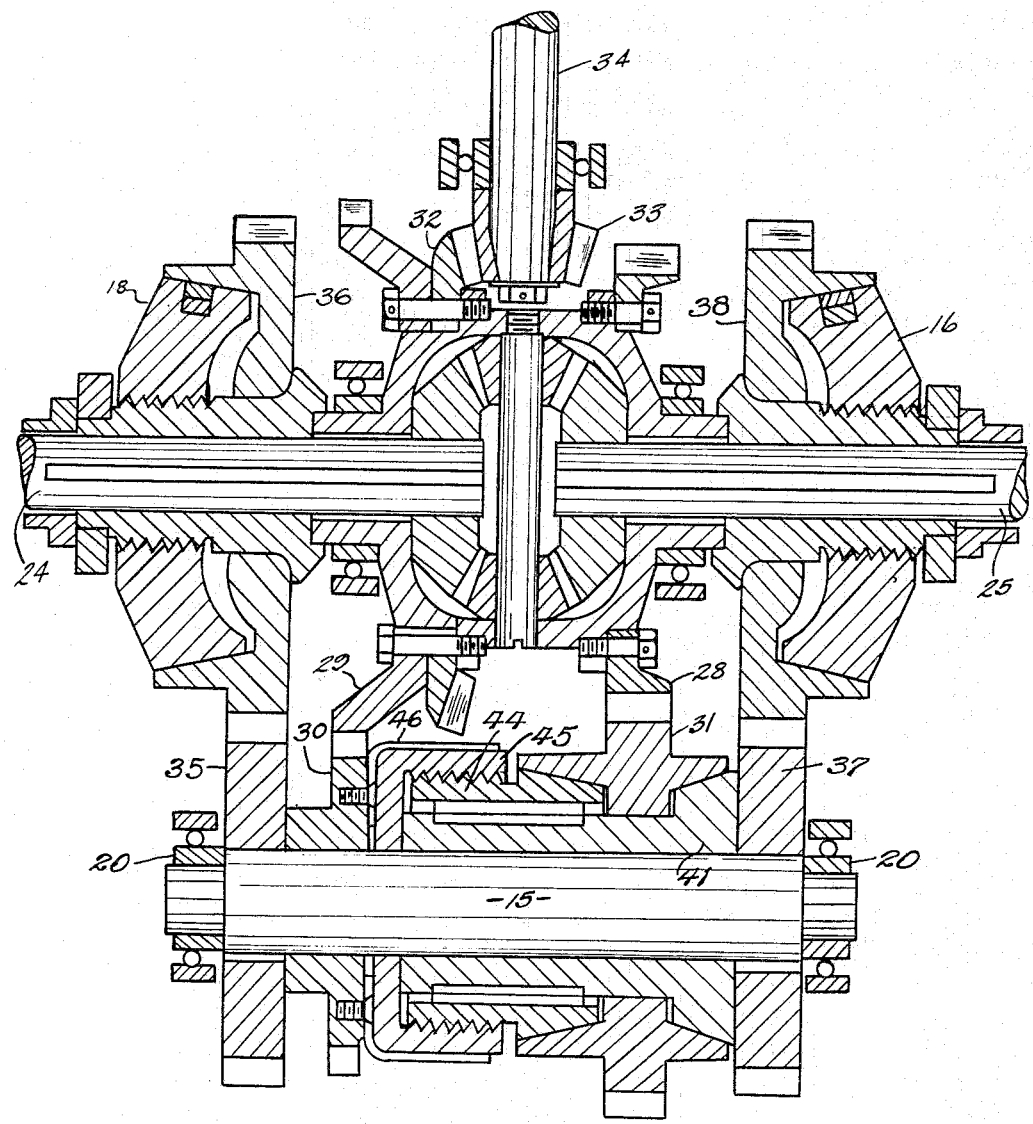
Figure 4 is a modified form utilizing the same principle of operation as disclosed in Figure 2.

In the modified form Figure 3, the inventor discloses the use of two countershafts instead of one, as used in Figure 2. In this form, the countershafts are placed in front of and on either side of the main drive shaft and the usual differential. The clutch sleeves 16 and 18 correspond with the clutch nuts 16 and 18 as shown in Figure 2 and the results obtained are identical in use. The device shown in Figure 4 corresponds with Figure 2 in that only one countershaft is used, the clutch sleeves 16 and 18 being placed on the axle shafts and are adapted to co-act one with the other by using external and internal threads on their respective parts.

Figure 5:
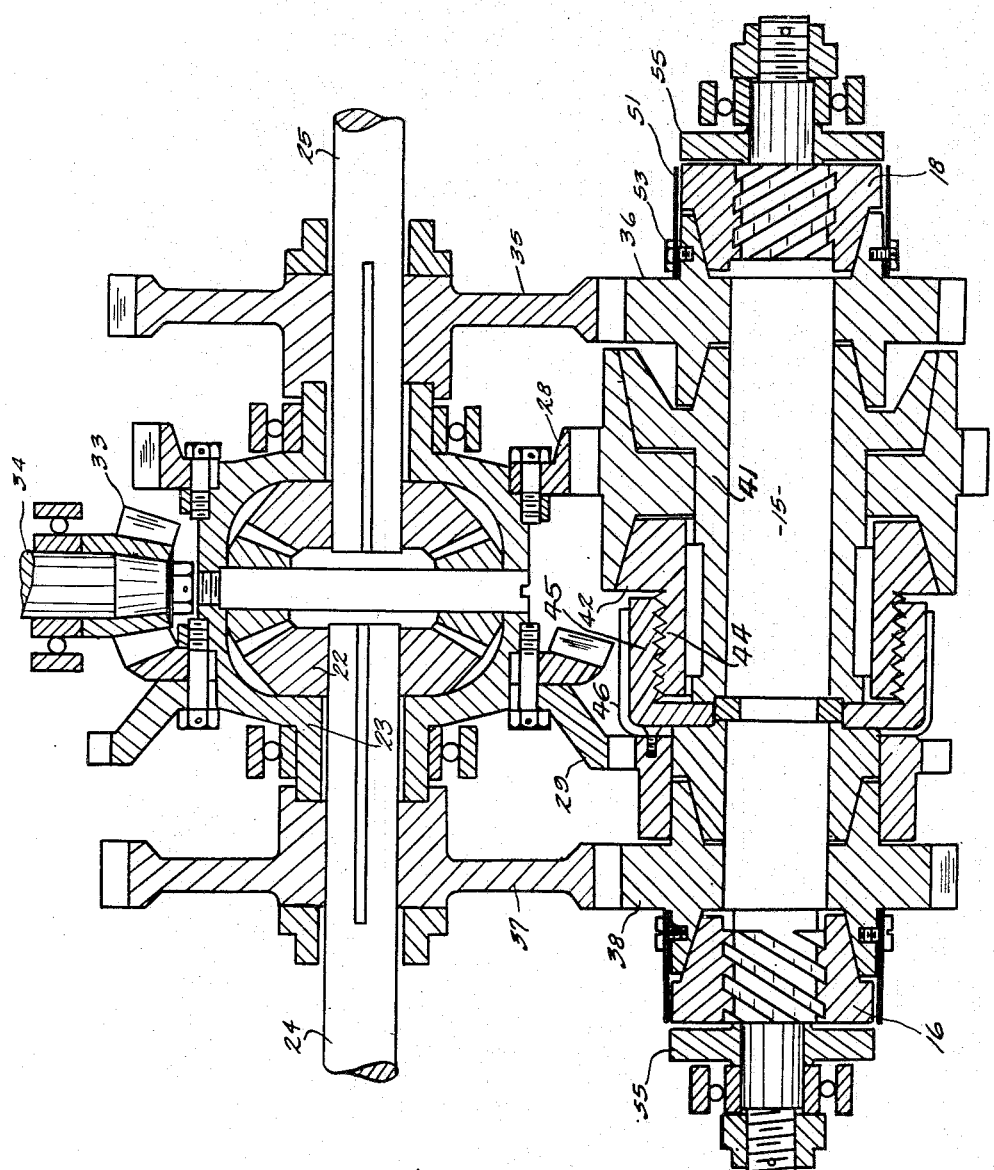
Figure 5 is another modified form of a limited ratio device, the results derived being identical with those of Figure 2.

Figure 5 in the modified forms is perhaps the closest in form to that disclosed in Figure 2. The clutch sleeves 16 and 18 are on the countershaft but the centrally located clutch is reversed, that is, it co-acts with the gear 29 as usual but gear 29 is placed on the opposite side to that shown in Figure 2.

Briefly the operation of the invention is fairly well confined through a common member for the two axles, the same as a differential is a common member for the two axles, but the differential does not have anything to do, or very little, with the control of the relative speeds of the axles, in other words, there is no limiting ratio control or limit control for the ratio, however it may be put.

In this invention there is really a ratio controlling mechanism in combination with the differential and axles extending therefrom, the single member through which the ratio control is obtained is in the one case the controlling shaft, indicated by the numeral 15, and which in the original form of the invention is a countershaft, but in the modified form, the single controlling member is really a clutch member mounted on the transmission shaft and operating through another clutch mechanism, this clutch member being preferably a circular flange extending from a sleeve mounted on the transmission shaft, but this common controlling member operates through two countershafts, one on either side of the transmission shaft, and through clutch members on the axles, so there is considerable difference in detail in regard to the construction of the modified form, though in the actual operation and in the invention itself, it is really the same principle, for in the original form of the invention, the axles are commonly connected through gear mechanism to the controlling shaft, and all of the gears on the controlling shaft are brought to fixed mountings through by clutch mechanisms.

As the housing of the differential is common to both axle shafts, so are the differential gears, and these common parts are always connected to the ratio control member and the same thing happens in the modified form for the transmission shaft is common to both axle shafts and the flange clutch member is always connected to the transmission shaft, and at the same time, it is always connected as has been mentioned above through the countershafts to the axle clutch mechanism.

Ordinarily the common member on the transmission shaft is running freely, but when it is clutched, it rotates with the transmission shaft.

The spring slip member used in making the clutch connection is again used in the modified form, and this has been very well explained in the original form.

The advantages of the invention are self evident for there are many cases where one driving wheel is mired and the other races or the mired one races and the other one is fast on the pavement, and this is taken care of in the ratio control mechanism, and all other forms of unevenness in regard to the ratio of the relative operations of the driven axles.

What I claim is:

1. In a limited ratio device, a separable housing having forwardly and rearwardly extending portions, right and left tubular members adapted to enclose a pair of driven shafts, a differential gear, a pair of gears adjacent thereto disposed on said driven shafts, said gears in direct communication with a pair of gears on a countershaft, a slidable clutch mounted and forming an integral part of said countershaft mounted at either end or a slidable clutch mounted on a drive shaft, an internally threaded tubular sleeve mounted on said countershaft and forming an integral part thereof, the movements of said threaded tubular sleeve adapted to be actuated through the movements of the differential gear said countershaft in turn itself performing a clutching and declutching means to govern the speed of the driven members.

2. In combination with a differential a limited ratio device comprising a shaft with an external thread, clutching members mounted thereon at either end, a rotatable housing forming an integral part of said shaft and forming part of the clutching mechanism in combination with an internally threaded sleeve portion, said sleeve portion adapted through its movements to engage and disengage a slidable clutch mechanism interposed centrally between said threaded portions and adapted to co-act with the main driving means.

3. In combination with a differential, a limited ratio device comprising a shaft journalled on either end, clutching mechanisms adapted to be actuated through the use of an external thread to be operated through the movements of said shaft, a rotatable housing forming an integral part of said shaft and part of the clutch mechanism, a tubular member internally threaded mounted thereon adapted to engage and disengage a slidable clutch, a pair of gears adapted thereto mounted on said shaft and in direct communication with a pair of gears fixed to the differential housing and having a ratio controlling mechanism including a driven member and a control member common to both axles and constantly engaged thereto by gear mechanisms and clutches automatically engaging and disengaging in agreement with the communicated speed acquired from a common control member.

4. In combination with a differential, an automatic limited ratio device comprising a driven member and a control member common to both axles, said control member having clutching mechanisms adapted to be actuated through the use of external threads on said control shaft and by the movement of same, a rotatable housing forming an integral part of said shaft and forming part of the clutching mechanism comprising in part an internally threaded sleeve and through the movement of said sleeve adapted to engage and disengage a slidable clutch mechanism interposed centrally between said threaded portions and adapted to co-act with the main driving means to impart to the two driving members speed to conform with a certain limited ratio.

5. In combination with a differential an automatic limited ratio device comprising a shaft with an external thread, clutching members mounted thereon at either end, a rotatable housing forming an integral part of said shaft and forming part of the clutching mechanism in combination with an internally threaded sleeve portion, said sleeve portion adapted through its movements to engage and disengage a slidable clutch mechanism interposed centrally between said threaded portions and adapted to co-act with the differential when the pre-determined ratio limit of that unit has been reached.

6. In combination with a differential, an automatic limited ratio device comprising a driven member and a control member common to both axles, said control member having clutching mechanisms adapted to be actuated through the use of external threads on said control shaft and by the movement of same, a rotatable housing forming an integral part of said shaft and forming part of the clutching mechanism comprising in part an internally threaded sleeve and through the movement of said sleeve adapted to engage and disengage a slidable clutch mechanism interposed centrally between said threaded portions and adapted to co-act with the main driving means to impart to the two driving members speed to conform with a certain limited ratio, particularly after the operating ratio of the differential itself has been reached.

DUNCAN ROLAND McCAFFERY.